United States Patent [19]
Heilmann et al.

[11] Patent Number: 5,146,200
[45] Date of Patent: Sep. 8, 1992

[54] HIGH-CAPACITANCE VARISTOR

[75] Inventors: Joachim Heilmann, Haar, Fed. Rep. of Germany; Heinrich Zoedl, Deutschlandsberg, Austria

[73] Assignee: Siemens Aktiengesellschaft, Munich, Fed. Rep. of Germany

[21] Appl. No.: 624,133

[22] Filed: Dec. 7, 1990

[30] Foreign Application Priority Data

Dec. 7, 1989 [DE] Fed. Rep. of Germany ....... 3940557

[51] Int. Cl.⁵ ............................................... H01C 7/10
[52] U.S. Cl. ...................................................... 338/21
[58] Field of Search ..................... 338/21, 20; 361/313, 361/320, 321

[56] References Cited

U.S. PATENT DOCUMENTS

| | | | |
|---|---|---|---|
| 4,430,255 | 2/1984 | Yan | 338/20 X |
| 4,729,058 | 3/1988 | Gupta et al. | 361/321 |
| 4,811,164 | 3/1989 | Ling et al. | 361/321 |
| 4,819,128 | 4/1989 | Florian et al. | 361/321 |
| 4,906,512 | 3/1990 | Roess | 338/21 X |

FOREIGN PATENT DOCUMENTS 1064574 9/1959 Fed. Rep. of Germany .

*Primary Examiner*—Marvin M. Lateef
*Attorney, Agent, or Firm*—Hill, Van Santen, Steadman & Simpson

[57] ABSTRACT

A high-capacitance varistor having two electrical chip components, namely a multi-layer varistor and a multi-layer capacitor. Respectively, two end faces positioned opposite one another are fashioned as metallized terminal surfaces. The two components are arranged one above the other and have adjacent lateral surfaces glued to one another such that their respective terminal surfaces lie parallel to one another and are connected to one another in an electrical conductive fashion with solder.

6 Claims, 1 Drawing Sheet

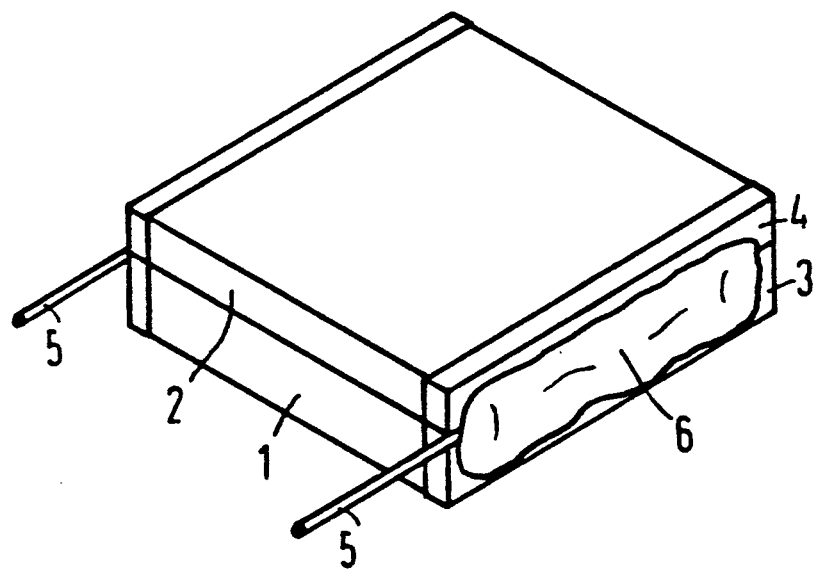

HIGH-CAPACITANCE VARISTOR

BACKGROUND OF THE INVENTION

The present invention is directed to a high-capacitance varistor having two chip components, in particular a multi-layer varistor and a multi-layer capacitor, wherein respectively two end faces opposed from one another are metallized terminal surfaces.

Varistors are non-linear, voltage-dependent resistors whose value of resistance decreases with increasing voltage. Varistors are mainly used for over-voltage protection. As a result of the varistor effect, which occurs when a pre-selected voltage is reached, further build-up of an over-voltage is prevented and the voltage is limited to values that lie just above an operating voltage.

Prior art metal oxide varistors have a relatively high self-capacitance of approximately 20 nF. However, with regards to over-voltage protection an even greater capacitance is desirable because the resultant low-pass filter characteristic smoothes steep over-voltage edges and thus improves the protective level of the varistor.

It is known to improve the protective function of varistors, for example in view of noise peaks in motor vehicle engines, in that a varistor and an additional capacitor are connected in parallel as wired, discrete components. However, this traditional high-capacitance varistor is still not acceptable because it doubles the space requirement on a printed circuit board and because assembly costs are double in comparison to a normal varistor.

Varistors are also known in the prior art that have an especially high self-capacitance that is attributed to a high proportion of strontium titanate in the varistor ceramic. However, such varistors also only have capacitances below approximately 100 nF, which is inadequate for a sufficient smoothing of, for example, noise spikes in motor vehicle engines.

SUMMARY OF THE INVENTION

It is therefore an object of the present invention to provide a varistor having capacitances between approximately 500 and 1500 nF that requires no more space on a printed circuit board than a traditional varistor, and whose assembly costs do not exceed those of a traditional, individual varistor.

In order to achieve this object, the varistor of the type initially cited is inventively characterized in that the two components are arranged above one another and have lateral adjacent surfaces glued to one another, such that their respective one terminal surfaces lie parallel to one another and are connected to one another with solder in an electrically conductive fashion. In one embodiment an end of a wire-shaped terminal element is embedded into the solder in order to provide a means for wiring the varistor into a circuit.

The object is also inventively achieved in that two components are arranged above one another and have their lateral adjacent surfaces glued to one another, such that their respective one terminal surfaces lie parallel to one another and the metallized terminal surfaces are coated with a common solder layer in a solder bath.

BRIEF DESCRIPTION OF THE DRAWING

The features of the present invention which are believed to be novel, are set forth with particularity in the appended claims. The invention, together with further objects and advantages, may best be understood by reference to the following description taken in conjunction with the accompanying drawing, in which:

The single figure is a perspective view of a varistor of the present invention.

DESCRIPTION OF THE PREFERRED EMBODIMENT

The wired, high-capacitance varistor schematically shown in the single figure is composed of two rectangular multi-layer components that are typically commercially available, such as a chip varistor 1 and a chip capacitor 2. The two components 1 and 2 that are each provided with tin-plated terminal surfaces 3 and 4, respectively, at two opposite end faces are arranged above one another and are glued to one another at lateral surfaces thereof that face toward one another. What is critical is that the terminal surfaces 3 and of the two components 1 and 2 lie parallel to one another and are connected to one another in an electrically conductive fashion with solder 6. As a result thereof, the two components 1 and 2 can be soldered as a unit and, for example, can be provided with terminal wires 5 whose ends are embedded into the solder 6. It is especially beneficial to guide the terminal wires 5, as shown, parallel to the glued surface over the entire length of the terminal surfaces 3 and 4 and to embed them in the solder 6. The wired, high-capacitance varistor can be encased in plastic.

Of course, it is also possible to omit the terminal elements and to solder the two components, that are joined to form a chip unit, directly onto a printed circuit board as a surface-mounted, high-capacitance varistor. For this embodiment the terminal surfaces 3 and 4 are coated with a common solder layer by, for example, immersion soldering.

It is a feature of the present invention, that the high-capacitance varistor formed from two commercial available components in the wired version requires approximately 30% less area on a printed circuit board and, in the surface-mounted version requires approximately 50% less area on the printed circuit board. A further advantage is that, by contrast to the two components of the prior art, only one component need be connected to the printed circuit board. This halving of the assembly costs can be achieved in a surprisingly simple manner on the basis of the described measures.

The invention is not limited to the particular details of the apparatus depicted and other modifications and applications are contemplated. Certain other changes may be made in the above described apparatus without departing from the true spirit and scope of the invention herein involved. It is intended, therefore, that the subject matter in the above depiction shall be interpreted as illustrative and not in a limiting sense.

What is claimed is:

1. High-capacitance varistor having two electronic chip components, such as a multi-layer varistor and a multi-layer capacitor, having respectively two end faces lying opposite one another fashioned as a metallized terminal surface, comprising the two components being arranged one above the other and having adjacent lateral surfaces glued to one another such that their respective metallized terminal surfaces lie parallel to one another and are electrically connected to one another with solder, the two components being attached to one another only by means of glueing and soldering.

2. High-capacitance varistor having two electronic chip components, such as a multi-layer varistor and a multi-layer capacitor, having respectively two opposite end faces that are fashioned as metallized terminal surfaces, comprising the two components being arranged one above the other and having adjacent lateral surfaces glued to one another such that their respective metallized terminal surfaces lie parallel to one another and are coated with a common solder layer by bath soldering, the two components being attached to one another only by means of glueing and soldering.

3. High-capacitance varistor according to claim 1, wherein the end of a wire-shaped terminal element is embedded into the solder.

4. High-capacitance varistor having a multi-layer varistor and a multi-layer capacitor, each of which having first and second opposed end faces that are metallized terminal surfaces, comprising a lateral surface of the multi-layer varistor glued to a lateral surface of the multi-layer capacitor such that the respective metallized terminal surfaces of each of the first and second end faces lie parallel to one another and are electrically connected to one another with solder, the two components being attached to one another only by means of glueing and soldering.

5. High-capacitance varistor according to claim 4, wherein an end of a wire-shaped terminal element is embedded into the solder.

6. High-capacitance varistor according to claim 4, wherein the electrical connection of the respective metallized terminal surfaces is a coating of a common solder layer.

* * * * *